INVENTORS
Gordon A. Burr and
Edwin E. Arnold.

May 7, 1935. G. A. BURR ET AL 2,000,688
SEAL
Filed March 18, 1932  2 Sheets-Sheet 2
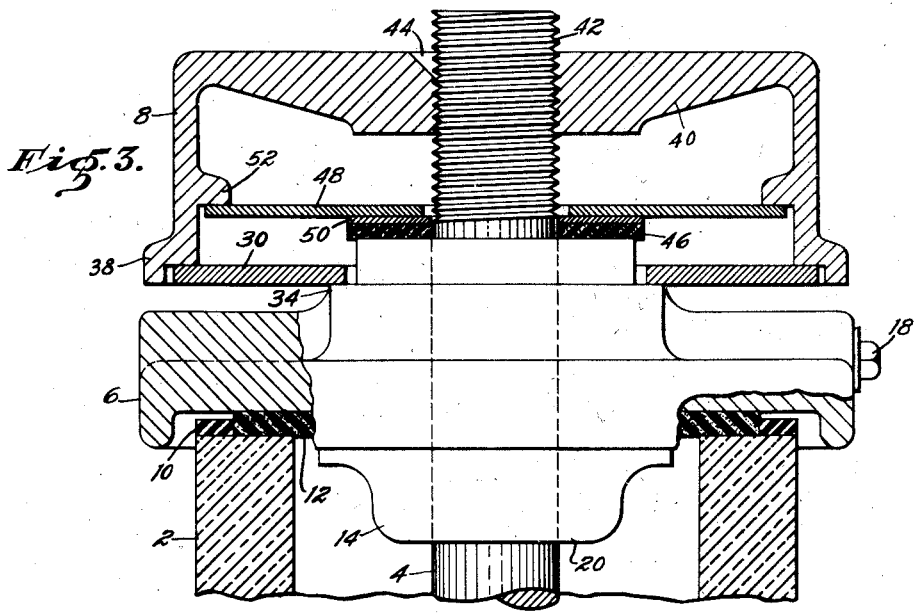
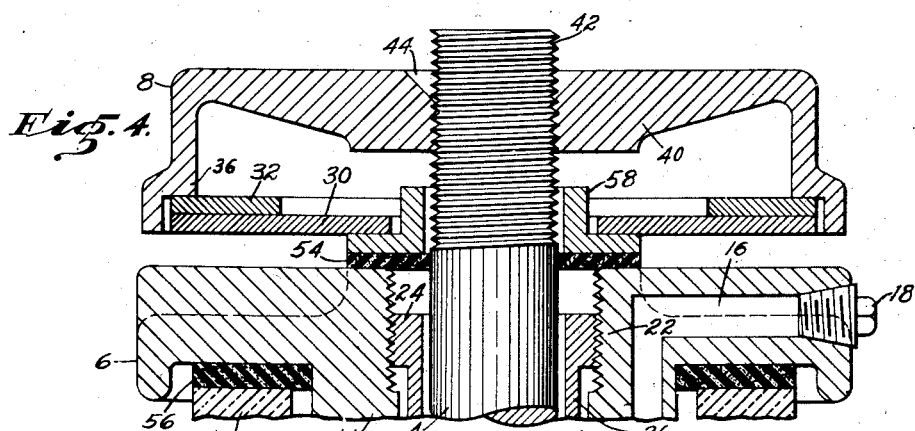
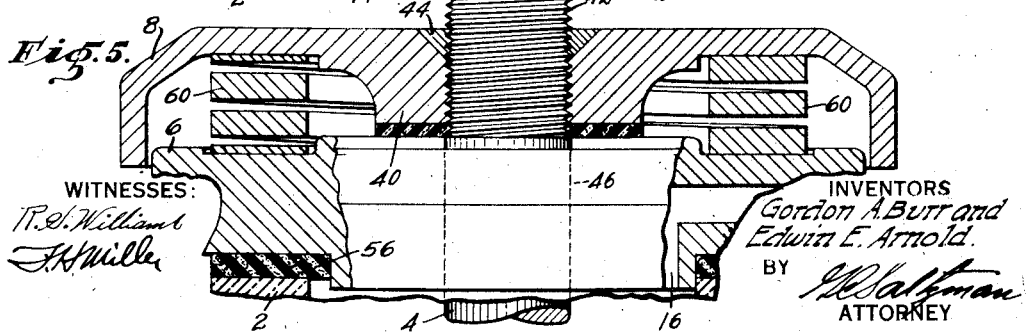
WITNESSES:
INVENTORS
Gordon A. Burr and
Edwin E. Arnold.
BY
ATTORNEY Patented May 7, 1935

2,000,688

UNITED STATES PATENT OFFICE 2,000,688

SEAL

Gordon A. Burr, Wilkinsburg, and Edwin E. Arnold, Pittsburgh, Pa., assignors to Westinghouse Electric and Manufacturing Company, a corporation of Pennsylvania Application March 18, 1932, Serial No. 599,702

4 Claims. (Cl. 173—318)

Our invention relates to seals and particularly to means for sealing the ends of high-voltage condenser bushings.

One object of our invention is to provide a seal, for a bushing or the like, that shall be maintained tight, irrespective of relative movement of the members sealed thereby.

Another object of our invention is to provide a seal structure that shall comprise a series of pressure seals of the same or different pressures.

A further object of our invention is to provide a seal that shall be simple and durable in construction, economical to manufacture and effective in its operation.

Figure 1:
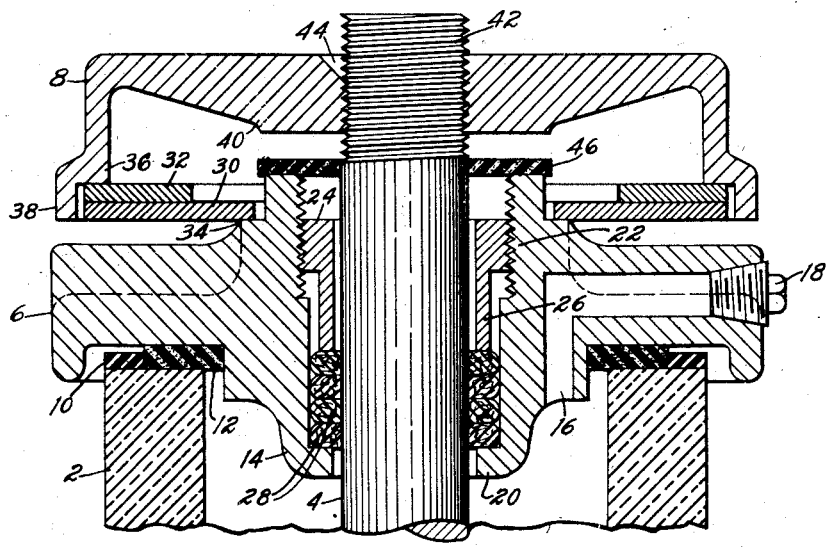

In the drawings, Figure 1 is a view, partially in side elevation and partially in longitudinal section, of one end of a bushing structure, showing the seal of our invention, in one form, with its parts assembled in relative positions prior to a final tightening thereof.

Figure 2:
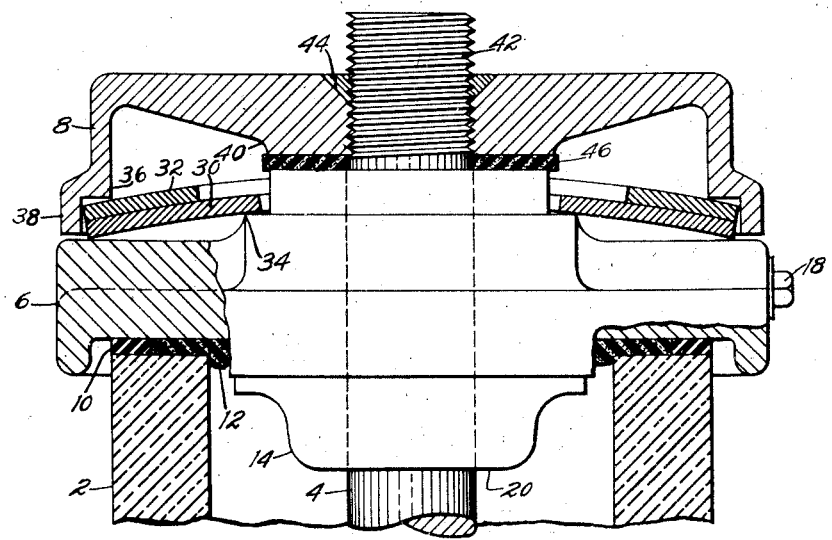

Fig. 2 is a view, similar to Fig. 1, indicating the parts substantially in the position assumed thereby after the said tightening, and Figs. 3, 4 and 5 are views, similar to Fig. 2, of modified forms of our invention.

Referring to Fig. 1, the device comprises, in general, a dielectric tube 2, a conductor 4, an end-closure cap 6 for the tube 2, and a nut 8 on the conductor 4.

The tube 2, preferably of porcelain, constitutes a portion of a bushing of a usual type and to which the through conductor 4 is secured in any suitable manner. The tube 2 and the conductor 4, being fixed relative to each other, have differential movement therebetween caused by temperature changes by reason of the widely different expansion characteristics of the porcelain tube and the conductor.

The tube 2 and the metal cap 6 have adjacent, preferably flat, surfaces, between which a composite sealing means, including gaskets 10 and 12, is disposed for compression thereby.

The gasket 10 is of relatively hard material, such as hard rubber, treated paper, asbestos or the like and is initially of less thickness than the gasket 12 which is of relatively soft material, such as soft rubber, cork or the like.

The cap 6 further comprises a stuffing box 14 and an oil inlet 16, the latter comprising intersecting longitudinal and radial sections and a screw-plug or cap 18 at the outer end of the radial section.

The stuffing box 14 comprises an inner annular flange or shoulder 20 closely fitting the conductor 4, a packing chamber above the flange 20 and an interiorly screw-threaded portion 22 for the reception of a nut 24. The latter has a tubular extension 26 for compressing packing gaskets 28 against the shoulder 20 and spreading them radially against the conductor 4 and the inner longitudinal surface of the stuffing box 14.

A laminated disc spring, including preferably flat steel washer-like members 30 and 32, surrounds the portion 22 on a shoulder 34 of the cap 6 and is engaged near its outer perimeter by a shoulder 36 of the nut 8. The latter is preferably of substantially inverted cup-shape, comprising an overhanging perimetral flange 38, and a central portion 40 that is interiorly screw-threaded and mounted for cooperation with an exteriorly screw-threaded section 42 of the conductor 4 projecting beyond the end of the tube 2. A frusto conical recess 44 is provided in the nut 8 for the reception of a sealing medium, such as solder.

In the positions illustrated, which are the positions of the assembled parts before turning the nut 8 to its operative position, the disc springs 30 and 32 are engaged, adjacent to the inner and outer perimeters thereof by the shoulders 34 and 36.

One of the springs 30 and 32 may be omitted, or further similar springs provided, in accordance with the clamping force required; the spring 32, in this instance being of shorter radial dimensions between its inner and outer perimeters, to reduce inductive loss. A gasket 46, of rubber, paper, asbestos, or the like, is provided between the part 22 and the shoulder 40 of the nut 8, as an additional sealing element.

Although we have shown and described disc springs in preferred embodiments of our invention, as having certain advantages over springs of other kinds, it is obvious that springs of any type for effecting substantially the same or like results are contemplated within the purview of our invention.

When the nut 8 is driven home, the springs 30 and 32 are flexed, as indicated in Fig. 2; the strength of the springs being so chosen that an excess of compression force is imposed on the gaskets 10 and 12. Thus, differential movement, between the tube 2 and the conductor 4, which may be caused by temperature changes, is compensated by a stored force in excess of the required sealing force. Constant pressure on the gasket 10 causes a gradual reduction in thickness thereof, which, if uncompensated, causes a gradual loosening of the seal.

The invention takes care of this factor whether both gaskets 10 and 12 are employed or only a single ordinary gasket, or superposed gaskets, are employed.

It has been usual to employ metal stops or shoulders to prevent undue compression of the sealing gasket but it has not been usual, so far as we are aware, to employ two or more gaskets in parallel, and of different sealing characteristic, as in the above-described structure. This structure greatly simplifies the manufacture and cost of the metal parts and is equally effective.

The gasket 10 is relatively hard, so that the softer gasket 12 is maintained resilient and not compressed beyond the limit of its ability to resist the sealing forces.

After the nut 8 has been tightened, a body of solder or other sealing medium is placed in the recess 44, as a further precaution against the ingress of moisture and the egress of oil.

The parts may be so proportioned as to cause the shoulder 40 to compress the gasket 46, when the springs 30 and 32 have been flexed to properly longitudinally displace the inner and outer perimeters thereof, as above set forth.

In Figs. 3 and 4 corresponding parts are designated by corresponding reference characters.

In Fig. 3, the spring 32 is omitted and instead of having the gasket 46 compressed by the shoulder 40, a spring 48, similar to the spring 30 but preferably weaker in this case, is provided for this purpose. It rests, at its inner perimeter, on a metal gasket 50, over the gasket 46, and is compressed, at its outer perimeter, by an additional shoulder 52 on the nut 8. Thus, a plurality of seals of the same or different pressures may be effective between the cap 6, which constitutes an intermediate element between the tube 2 and the conductor 4 disposed in series relation.

In the form of our invention, illustrated in Fig. 4, series related seal gaskets 54 and 56 are compressed by a single spring unit comprising the rings 30 and 32 which are supported, at the inner perimeter of the ring 30, by a member 58 which takes the places of the shoulder 34 and a portion of the part 22 of Fig. 1.

In Fig. 5, the cap 6 and the nut 8 are adapted to receive and to seat a helical spring 60 having substantially parallel-plane ends and convolutions of flat-strap character.

While we have shown and described particular forms of our invention, changes may be effected therein without departing from the spirit and scope thereof, as set forth in the appended claims.

We claim as our invention:

1. The combination of a dielectric tube, a conductor extending axially through and having a portion projecting beyond said tube, an end closure cap for said tube having a centrally disposed stuffing box for maintaining a seal between said cap and the projecting portion of said conductor, a ring-like gasket providing a seal between the cap and the end of said tube, and resilient means on the projecting portion of said conductor for pressing said cap upon the end of said tube.

2. The combination of a dielectric tube, a conductor extending axially through and having a portion projecting beyond said tube, an end closure cap for said tube, an annular gasket between the end of said tube and said cap, a second annular gasket adjacent the opposite surface of said cap and said conductor, and means on the projecting portion of said conductor comprising a resilient member for compressing said gaskets to maintain a seal between said cap, tube and conductor irrespective of the relative movement of said conductor.

3. The combination of a dielectric tube, a conductor extending axially through and having a portion projecting beyond said tube, an end closure cap for said tube through which the conductor movably extends, a first annular gasket providing a seal between said cap and said tube, a second annular gasket adjacent the opposite surface of said cap and said conductor, an adjustable member supported on the projecting portion of said conductor, resilient means associated with the adjustable member for pressing said cap on said first gasket and additional resilient means associated with said adjustable member for compressing said second gasket upon said cap and conductor.

4. In combination, a dielectric tube element, a conductor element movable relative thereto and having a portion projecting from an end thereof, an end cap element for the tube through which the conductor movably extends, a yieldable ring-like gasket disposed to provide a seal between the tube and the cap, a second yieldable ring-like gasket associated with the cap and the conductor, and means for compressing the gaskets including a nut element on the conductor, a spring surrounding the conductor and disposed to apply a compressing force to the first-named gasket and a second spring surrounding the conductor and disposed to apply a compressing force to both gaskets.

GORDON A. BURR.
EDWIN E. ARNOLD.